(12) United States Patent
Okuda et al.

(10) Patent No.: US 12,387,339 B2
(45) Date of Patent: Aug. 12, 2025

(54) DATA GENERATION APPARATUS, DATA GENERATION METHOD, AND PROGRAM

(71) Applicants: NIIGATA UNIVERSITY, Niigata (JP); Denka Company Limited, Tokyo (JP)

(72) Inventors: Shujiro Okuda, Niigata (JP); Yu Watanabe, Niigata (JP); Hiroshi Izutsu, Tokyo (JP); Keisuke Kodama, Tokyo (JP)

(73) Assignees: NIIGATA UNIVERSITY, Niigata (JP); Denka Company Limited, Tokyo (JP)

( * ) Notice: Subject to any disclaimer, the term of this patent is extended or adjusted under 35 U.S.C. 154(b) by 435 days.

(21) Appl. No.: 17/917,542

(22) PCT Filed: Apr. 5, 2021

(86) PCT No.: PCT/JP2021/014494
§ 371 (c)(1),
(2) Date: Oct. 6, 2022

(87) PCT Pub. No.: WO2021/206053
PCT Pub. Date: Oct. 14, 2021

(65) Prior Publication Data
US 2023/0148243 A1  May 11, 2023

(30) Foreign Application Priority Data

Apr. 6, 2020 (JP) ................. 2020-068413

(51) Int. Cl.
*G06T 7/11* (2017.01)
*G06T 7/00* (2017.01)
(Continued)

(52) U.S. Cl.
CPC .............. *G06T 7/11* (2017.01); *G06T 7/0012* (2013.01); *G06T 11/001* (2013.01);
(Continued)

(58) Field of Classification Search
None
See application file for complete search history.

(56) References Cited

U.S. PATENT DOCUMENTS 5,222,206 A * 6/1993 Liao ..................... G06T 11/001
345/592
10,572,996 B2   2/2020 Euren
(Continued)

FOREIGN PATENT DOCUMENTS

CN       106339591 A *  1/2017  .......... G06K 9/4604
CN       110503151 A * 11/2019  ............. G06N 20/00
(Continued)

OTHER PUBLICATIONS

Patent Cooperation Treaty, International Search Report, Application No. PCT/JP2021/014494, dated May 18, 2021, in 4 pages.
(Continued)

*Primary Examiner* — Bernard Krasnic
(74) *Attorney, Agent, or Firm* — PROCOPIO, CORY, HARGREAVES & SAVITCH LLP

(57) ABSTRACT

There is provided a data generation apparatus including a display control unit that displays, on a screen, an image and borders of a plurality of partial images generated by dividing the image into a plurality of pieces while the image and the borders are superimposed together, an input unit that receives input of a label to be given to each of the plurality of partial images, and a generation unit that generates learning data for causing a learning model to learn by associating each of the plurality of partial images with the label given to the corresponding partial image of the plurality of partial images.

11 Claims, 6 Drawing Sheets

(51) Int. Cl.
  *G06T 11/00* (2006.01)
  *G06V 10/774* (2022.01)

(52) U.S. Cl.
  CPC .. *G06V 10/774* (2022.01); *G06T 2207/10024* (2013.01); *G06T 2207/20021* (2013.01); *G06T 2207/20081* (2013.01); *G06T 2207/30096* (2013.01); *G06T 2210/41* (2013.01)

(56) References Cited

U.S. PATENT DOCUMENTS

| | | | |
|---|---|---|---|
| 10,916,010 | B2 | 2/2021 | Sugahara |
| 11,295,447 | B2 | 4/2022 | Wakai et al. |
| 2005/0152592 | A1 | 7/2005 | Kasai |
| 2012/0209833 | A1* | 8/2012 | Kramer ............... G06F 16/58 707/723 |
| 2015/0193929 | A1 | 7/2015 | Ikemoto |
| 2016/0301813 | A1* | 10/2016 | Swire ............... H04N 1/00145 |
| 2019/0065996 | A1 | 2/2019 | Matsuki |
| 2019/0355113 | A1 | 11/2019 | Wirch et al. |
| 2020/0178940 | A1* | 6/2020 | Hare, II ............... G16H 30/40 |
| 2020/0211189 | A1* | 7/2020 | Yip ............... G06V 20/69 |
| 2021/0177373 | A1* | 6/2021 | Xie ............... A61B 8/463 |
| 2021/0209758 | A1* | 7/2021 | Buckland ............... G06F 18/243 |

FOREIGN PATENT DOCUMENTS

| | | |
|---|---|---|
| JP | 2005-185560 A | 7/2005 |
| JP | 3720538 B2 * | 11/2005 |
| JP | 2014-018332 A | 2/2014 |
| JP | 2017-099721 A | 6/2017 |
| JP | 2017-117019 A | 6/2017 |
| JP | 2017-162098 A | 9/2017 |
| JP | 2019-046058 A | 3/2019 |
| JP | 2019-146935 A | 9/2019 |
| JP | 2019-525151 A | 9/2019 |
| JP | 2019-200558 A | 11/2019 |
| WO | 2019/159821 A1 | 8/2019 |

OTHER PUBLICATIONS

Ta V-T et al., "Graph-based tools for microscopic cellular image segmentation", vol. 42, No. 6, Jun. 1, 2009, pp. 1113-1125, 13 total pages.

* cited by examiner

DATA GENERATION APPARATUS, DATA GENERATION METHOD, AND PROGRAM

CROSS-REFERENCE TO RELATED APPLICATIONS

[01] This application is US National Stage of International Patent Application PCT/JP2021/014494, filed Apr. 5, 2021, which claims benefit of priority from Japanese Patent Application JP2020-068413, filed Apr. 6, 2020, the contents of both of which are incorporated herein by reference.

TECHNICAL FIELD

The present relates to a data generation apparatus, a data generation method, and a program.

BACKGROUND ART

Systems which analyze a pathological image using artificial intelligence and make a pathological diagnosis are currently known. For example, Patent Literature 1 describes causing a machine learning algorithm to learn using a plurality of annotated digital pathological images, using an identification model generated by the learning to identify whether an abnormal image pattern corresponds to a pathological abnormality, and the like.

CITATION LIST

Patent Literature

Patent Literature 1: National Publication of International Patent Application No. 2019-525151

SUMMARY OF INVENTION

Technical Problem

In order to cause a learning model to learn, a large number of pathological images, each including a label indicating presence or absence of an abnormality, need to be prepared as learning data. Since a doctor needs to judge whether a pathological image contains an abnormality, doctors bear a great burden at the time of generating a large amount of learning data. Note that similar problems can arise not just in pathological images but also in all types of images.

Under the circumstances, the present invention has as its object to provide a technique capable of more easily generating image-related learning data.

Solution to Problem

A data generation apparatus according to an aspect of the present invention includes a display control unit that displays, on a screen, an image and borders of a plurality of partial images generated by dividing the image into a plurality of pieces while the image and the borders are superimposed together, an input unit that receives input of a label to be given to each of the plurality of partial images, and a generation unit that generates learning data for causing a learning model to learn by associating each of the plurality of partial images with the label given to the corresponding partial image of the plurality of partial images.

Advantageous Effect of Invention

According to the present invention, it is possible to provide a technique capable of more easily generating image-related learning data.

Figure 1:
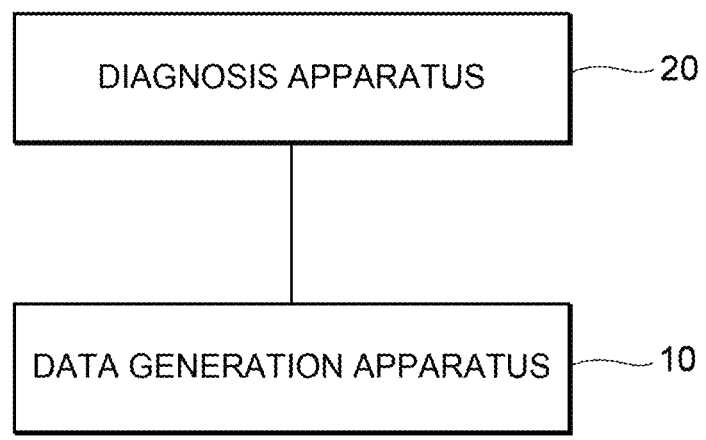
FIG. 1 is a diagram showing an example of an image processing system for determining whether a pathological image has an abnormality.

Figure is a view for explaining a process of dividing a pathological image.

DESCRIPTION OF EMBODIMENT

An embodiment of the present invention will be described with reference to the accompanying drawings. Note that objects denoted by the same reference numerals have the same or similar configurations in the drawings. Note that although the present embodiment will be described taking as an example a case of generating, from an input pathological image, learning data related to the pathological image, the present invention is not limited to this. The present embodiment can be applied to a case of generating learning data from various images. For example, the present embodiment can also be applied to two-dimensional image data for medical purposes, such as an ultrasonic image, a CT image, or an endoscopic image. The present embodiment can also be applied to images for purposes other than medical purposes.

<System Configuration>

FIG. 1 is a diagram showing an example of an image processing system 1 for determining whether a pathological image has an abnormality. A data generation apparatus 10 is an apparatus for using a pathological image input to the data generation apparatus 10 to generate learning data (training data) for causing a learning model which a diagnosis apparatus 20 includes to learn. The diagnosis apparatus 20 is an apparatus for using a learned model after learning using learning data generated by the data generation apparatus 10 to determine whether a pathological image has an abnormality. The data generation apparatus 10 and the diagnosis apparatus 20 can communicate with each other via a wireless or wired communication network N.

The data generation apparatus 10 displays a pathological image input to the data generation apparatus 10 and borders of a plurality of partial images generated by dividing the pathological image into a plurality of pieces on a screen while the pathological image and the borders are superimposed together. A partial image may be referred to as a tile. The size (vertical and horizontal pixel counts) of a partial image is the same as the size of learning data which can be input to a learning model. The data generation apparatus 10 receives, for each of the partial images displayed on the screen, input of a pathology-related label to be given to the partial image from a pathologist or the like (hereinafter referred to as a "user") which uses the data generation apparatus 10. Although the following description will be given on the assumption that labels are two types of labels indicating whether a partial image has a pathological abnormality, the present embodiment is not limited to this. The present embodiment can also be applied to a case of giving three or more types of labels.

The data generation apparatus 10 may generate learning data from one pathological image or may generate learning data from a plurality of pathological images. If learning data is generated from a plurality of pathological images, the data generation apparatus 10 repeats, for each pathological image, a process of dividing the pathological image into a plurality of partial images and receiving input of labels. When label giving by a user is complete for all the pathological images, the data generation apparatus 10 generates learning data by associating image data of each partial image with the label given to the corresponding partial image. The generated learning data is sent to the diagnosis apparatus 20.

The diagnosis apparatus 20 uses learning data sent from the data generation apparatus 10 to cause a learning model to learn (train). The learning model is, for example, a neural network which can be provided with a predetermined capability by learning. The diagnosis apparatus 20 inputs a pathological image as an object to be diagnosed to a learned model generated by learning and determines on the basis of an output result from the learned model whether the pathological image has an abnormality.

Note that although the data generation apparatus 10 is shown as one information processing apparatus in the example in FIG. 1, the present embodiment is not limited to this. For example, the data generation apparatus 10 may be formed from, e.g., one or a plurality of physical servers, may be formed using a virtual server running on a hypervisor, or may be formed using a cloud server.

<Hardware Configuration>

Figure 2:
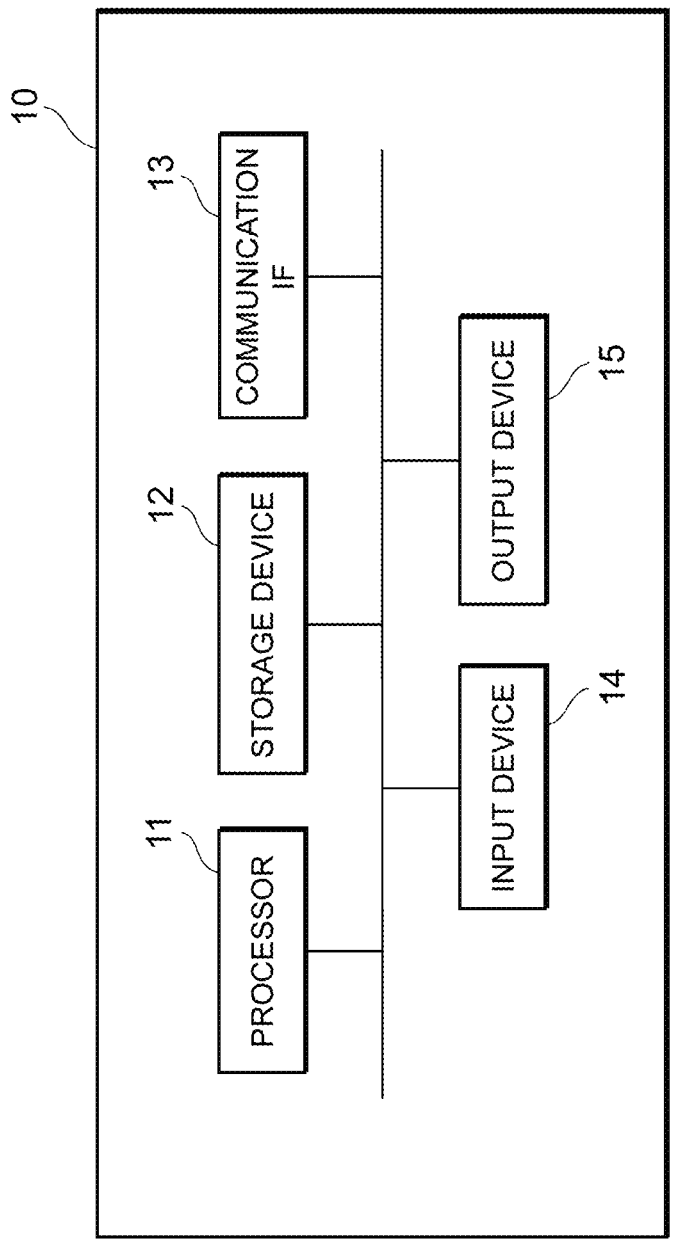
FIG. 2 is a diagram showing an example of a hardware configuration of a data generation apparatus.

FIG. 2 is a diagram showing an example of a hardware configuration of the data generation apparatus 10. The data generation apparatus 10 has a processor 11, such as a CPU (Central Processing Unit) or a GPU (Graphical processing unit), a storage device 12, such as a memory, an HDD (Hard Disk Drive), and/or an SSD (Solid State Drive), a communication IF (Interface) 13 which performs wired or wireless communication, an input device 14 which receives an input manipulation, and an output device 15 which outputs information. The input device 14 is, for example, a keyboard, a touch panel, a mouse, and/or a microphone. The output device 15 is, for example, a display, a touch panel, and/or a speaker.

<Functional Block Configuration>

Figure 3:
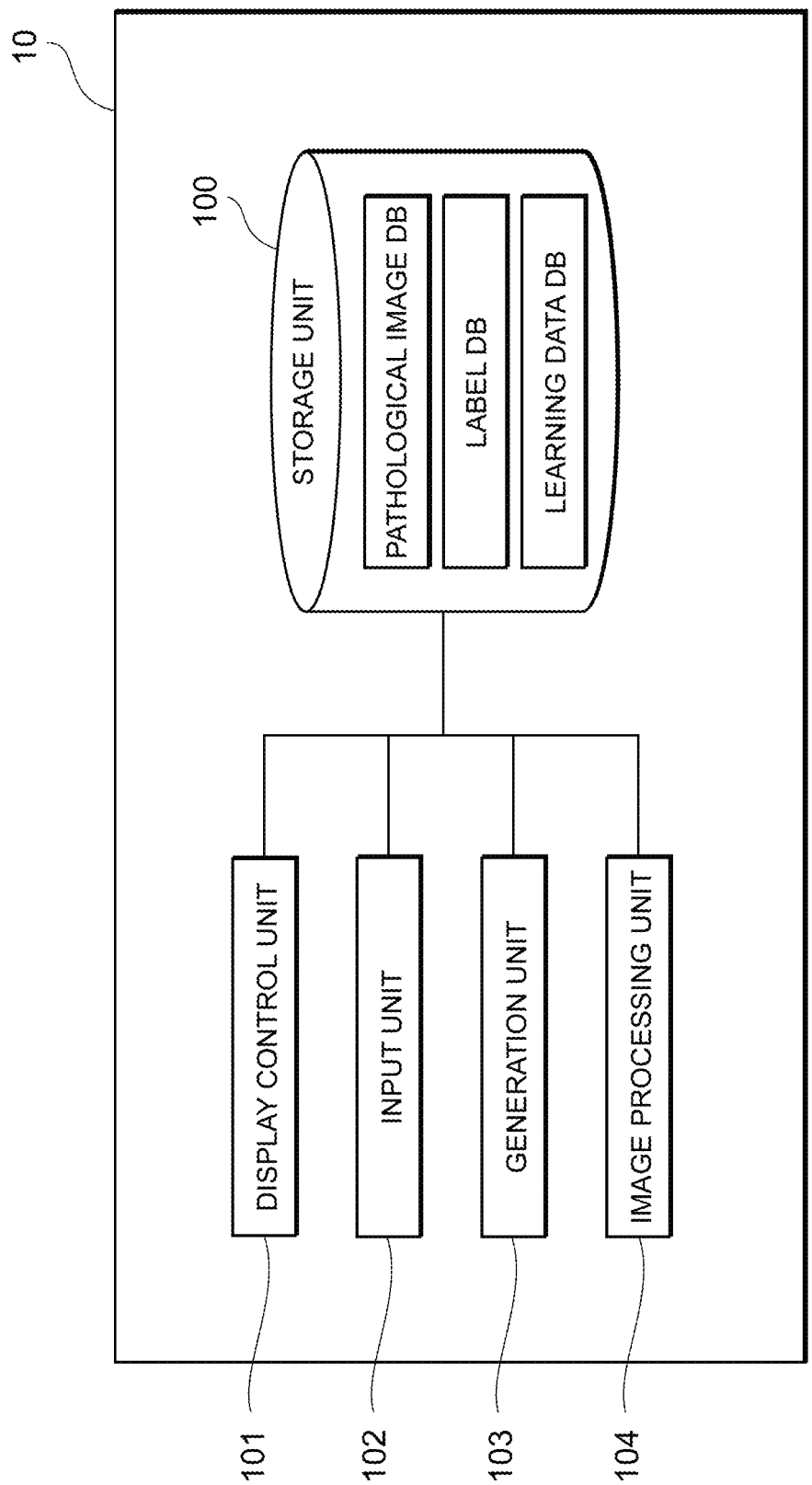
FIG. 3 is a diagram showing an example of a functional block configuration of the data generation apparatus.

FIG. 3 is a diagram showing an example of a functional block configuration of the data generation apparatus 10. The data generation apparatus 10 includes a storage unit 100, a display control unit 101, an input unit 102, a generation unit 103, and an image processing unit 104. The storage unit 100 can be implemented using the storage device 12 that the data generation apparatus 10 includes. The display control unit 101, the input unit 102, the generation unit 103, and the image processing unit 104 can be implemented through execution of a program stored in the storage device 12 by the processor 11 of the data generation apparatus 10. The program can be stored in a storage medium. The storage medium storing the program may be a computer readable non-transitory storage medium (non-transitory computer readable medium). The non-transitory storage medium is not particularly limited and may be, for example, a storage medium, such as a USB memory or a CD-ROM.

The storage unit 100 stores a pathological image DB (image DB) storing one or more pathological images (images) used to generate learning data, a label DB storing a label given to a partial image by a user, and a learning data DB storing generated learning data.

The display control unit 101 displays various types of screens according to the present embodiment on the output device 15, such as a display, another information processing apparatus that communicates with the data generation apparatus 10, or the like. The display control unit 101 displays a screen in which borders of partial images are superimposed on a pathological image (image).

The input unit 102 receives various types of inputs from a user. The input unit 102 also receives input of a label to be given to each of a plurality of partial images from the user via the input device 14. The input unit 102 stores a label given to each partial image in the label DB. The input unit 102 may store, for example, a partial image ID for unique identification of each partial image and the label given to the corresponding partial image in the label DB in association with each other. Label input may be performed by, for example, selecting a partial image, for which a label is to be input, from among partial images displayed on a screen and receiving designation of the label to be given to the partial image.

To generate learning data from a plurality of pathological images (a plurality of images), the input unit 102 may receive input of information on a pathology type corresponding to the plurality of pathological images (the type of a pathology common to the plurality of pathological images and an image type corresponding to the plurality of images).

The generation unit 103 generates learning data for causing a learning model to learn by associating each of a plurality of partial images with the label given to the corresponding partial image of the plurality of partial images by the input unit 102. For example, the generation unit 103 acquires a partial image ID and a label from the label DB and extracts image data of a partial image corresponding to the partial image ID from among pathological images (images) stored in the pathological image DB (image DB). The generation unit 103 then generates learning data by combining the extracted image data of the partial image and the label corresponding to the partial image ID.

The image processing unit 104 changes colors of a plurality of pathological images (a plurality of images) in accordance with a color change method determined for a pathology type (image type) input to the input unit 102. A method that changes an RGB value of each pixel in the plurality of pathological images (the plurality of images) into a standardized value and a method that randomly changes the RGB value of each pixel in the plurality of pathological images (the plurality of images) may be included in the change method.

<Procedures>

Figure 4:
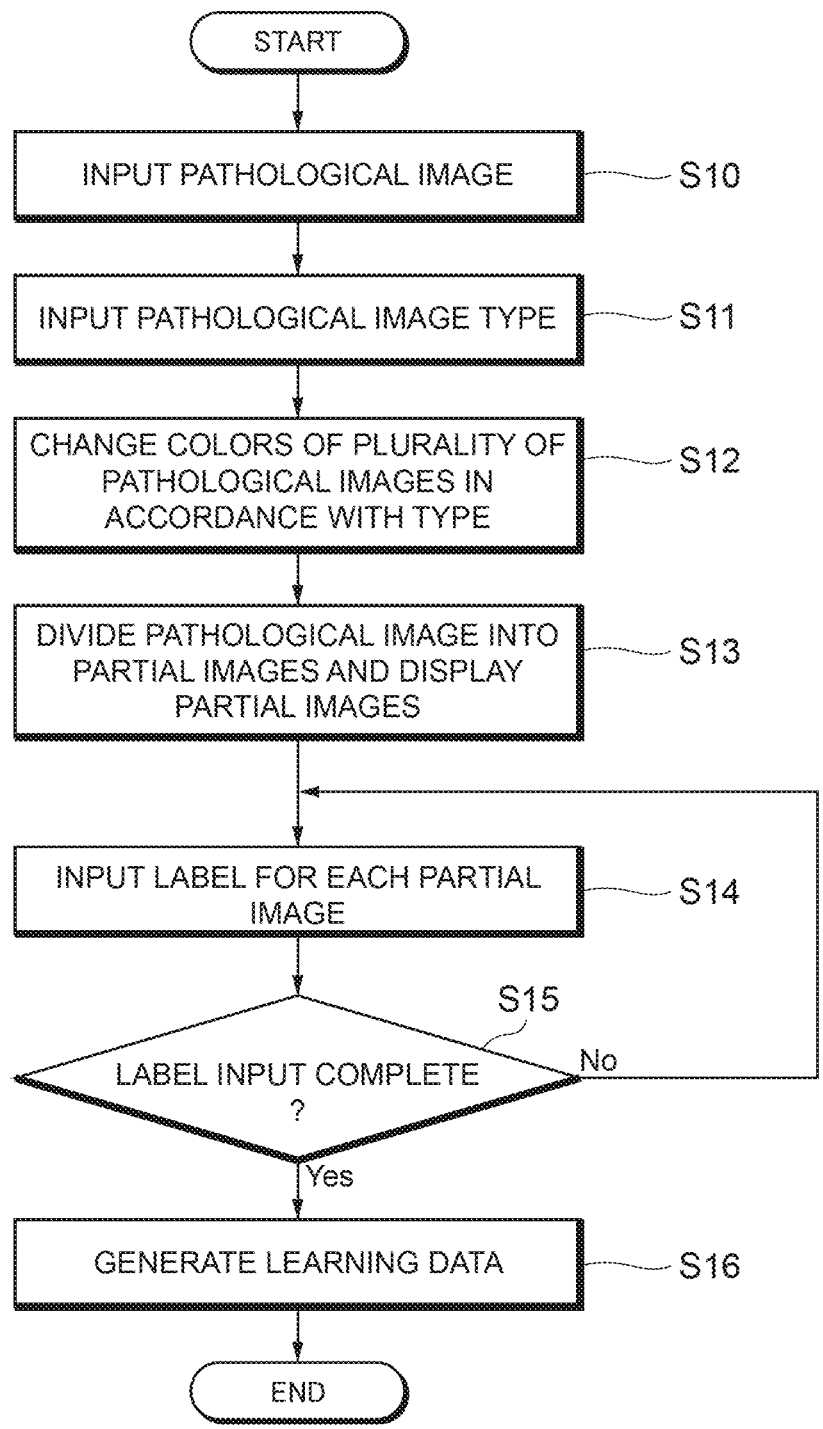
FIG. 4 is a flowchart showing an example of procedures to be performed by the data generation apparatus.

FIG. 4 is a flowchart showing an example of procedures to be performed by the data generation apparatus 10. First, the input unit 102 receives input of a pathological image used to generate learning data from a user and stores the input pathological image in the pathological image DB (S10). To easily determine whether the pathological image has an abnormality, staining is usually performed. Examples of a method of the staining include hematoxylin and eosin stain, PAS stain, Pappenheim stain, alcian blue stain, Papanicolaou stain, Azan stain, Elastica-van Gieson method, and Elastica-Masson stain. Note that, in a case of inputting a plurality of pathological images, the user inputs pathological images, pathology types of which are the same. The following description is based on the assumption that a plurality of pathological images are input by the user.

The input unit 102 receives input of information on a pathology type from the user for the plurality of pathological images input in the procedure in step S10 (S11). A pathology type which can be input may be, for example, either "tumor" or "hypermutation." If each of the plurality of pathological images is a tumor image, the user inputs "tumor" as the pathology type. If each of the plurality of pathological images is a hypermutation image, the user inputs "hypermutation" as the pathology type.

The image processing unit 104 changes colors of the plurality of pathological images in accordance with a color change method corresponding to the pathology type input in the procedure in step S11 (S12). For example, if the pathology type is "tumor," the color change method may be changing an RGB value of each pixel in the plurality of pathological images to a standardized value. First, the image processing unit 104 calculates a mean value and a standard deviation of R (Red) values, a mean value and a standard deviation of G (Green) values, and a mean value and a standard deviation of B (Blue) values for all pixels in the plurality of pathological images. The image processing unit 104 then standardizes the respective R values of all the pixels in the plurality of pathological images, using the mean value and the standard deviation of the R values. Specifically, a standardized R value can be calculated using the equation: standardized R value=(R value-mean value of R values)/standard deviation of R values). Similar calculations are performed for a G value and a B value, thereby calculating a standardized G value and a standardized B value. This allows equalization of tones of the plurality of pathological images.

If the pathology type is "hypermutation," the color change method may be a method that shifts the RGB value of each pixel in the plurality of pathological images in a manner randomly selected for each pathological image. First, the image processing unit 104 randomly determines a number, by which an RGB value is to be shifted, for each pathological image and shifts an R value, a G value, and a B value by the determined value. For example, if the image processing unit 104 determines a number, by which an RGB value is to be shifted, to be "5" for a first pathological image, the image processing unit 104 adds 5 to an R value, a G value, and a B value of each pixel included in the pathological image. If the image processing unit 104 determines a number, by which an RGB value is to be shifted, to be "−2" for a second pathological image, the image processing unit 104 adds −2 to an R value, a G value, and a B value of each pixel included in the pathological image. The image processing unit 104 repeats similar processing for all the pathological images. This makes it possible to cause the tones of the plurality of pathological images to vary.

The display control unit 101 selects one pathological image from among the plurality of input pathological images and displays a screen in which borders of partial images are superimposed on the selected pathological image (S13). The input unit 102 then receives input of a label to be given for each partial image (S14). If the plurality of input pathological images are tumor images, a label which the user is to give to each partial image is either a label indicating that the partial image is a tumor image or a label indicating that the partial image is not a tumor image. If the plurality of input pathological images are hypermutation images, a label which the user is to give to each partial image is either a label indicating that the partial image is a hypermutation image or a label indicating that the partial image is not a hypermutation image.

The input unit 102 stores each received label in the label DB in association with a partial image ID. If label input is not complete for the partial images (NO in S15), the data generation apparatus 10 repeats the procedure in step S14. If label input is complete for the partial images (YES in S15), the generation unit 103 generates learning data by associating image data of each partial image, for which labeling is complete, with a given label (S16). The determination as to whether label input is complete may be made on the basis of whether a press of a predetermined button (e.g., a button to start generation of learning data) on the screen is detected by the input unit 102. Alternatively, the determination may be made on the basis of whether labels are given to a predetermined number of partial images. Alternatively, it may be automatically determined that label giving is complete if labels are given to a predetermined number of partial images, and if a ratio between labels given to partial images (a ratio of respective label types) falls within a predetermined range (e.g., a ratio between labels indicating tumor images and labels indicating non-tumor images is approximately 1:4).

The generation unit 103 may store the generated learning data in the learning data DB while the generated learning data are sorted into folders for different labels. For example, the generation unit 103 may store image data of a partial image given a tumor-containing label and image data of a partial image given a tumor-free label in different folders.

In the above-described procedures, a partial image, a tissue-free portion of which accounts for a predetermined percentage or higher, (a partial image meeting a predetermined condition) may be excluded from learning data. For example, the input unit 102 may reject input of a label for a partial image, a portion in a specific color (e.g., a white portion) of which accounts for the predetermined percentage or higher, among a plurality of partial images in each pathological image in the procedure in step S14. The generation unit 103 may exclude a partial image, for which label input is not received by the input unit 102, among a plurality of partial images in learning data to be generated in the procedure in step S16. This makes it possible to inhibit learning data inappropriate for learning by a learning model from being generated.

Figure 5:
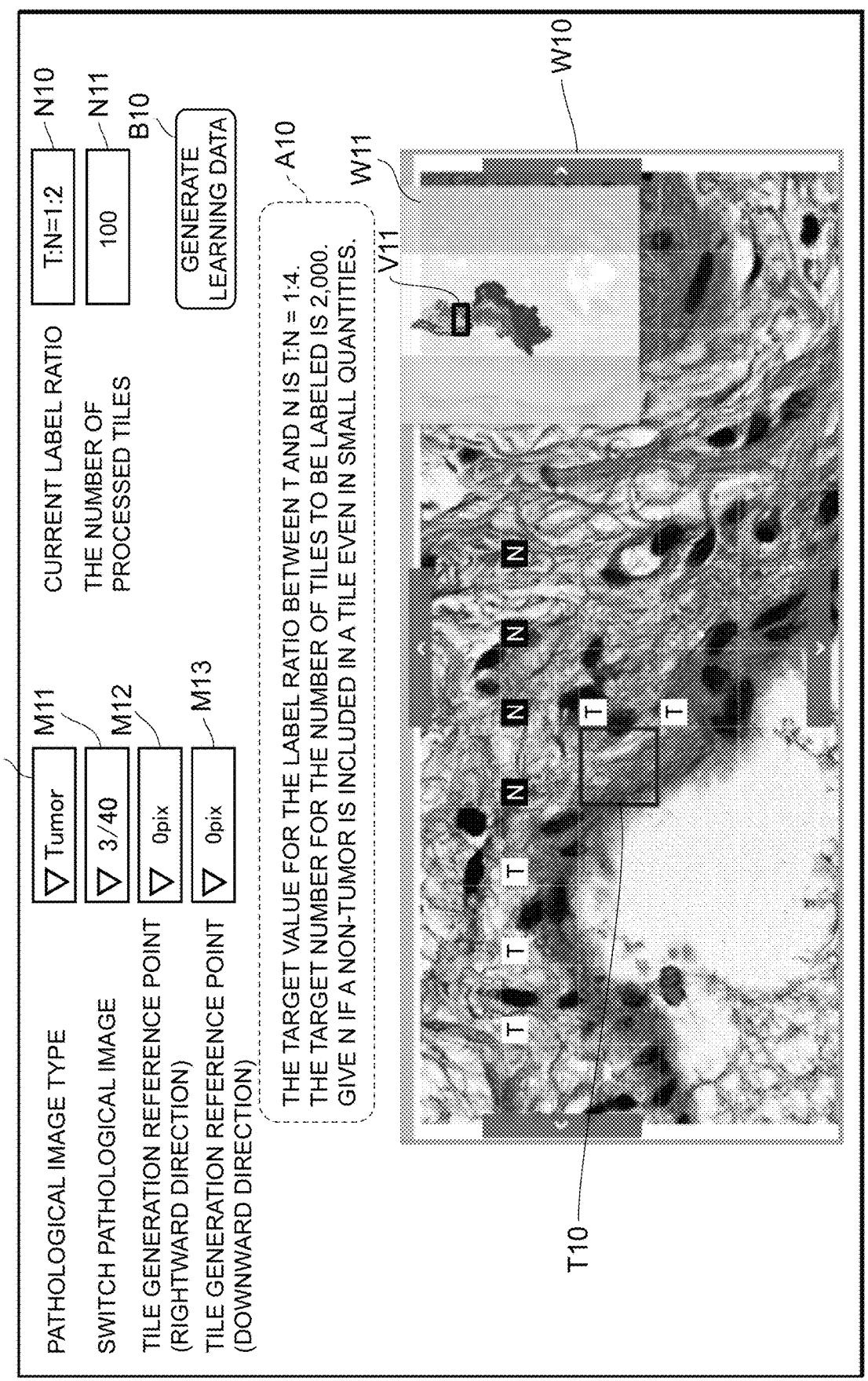
FIG. 5 is a view showing an example of a screen where labeling is to be performed.

FIG. 5 is a view showing an example of a screen where labeling is to be performed. FIG. 5 shows an example in a case where a pathological image is an image containing a tumor cell. A selection menu M10 is a menu to designate the type of pathological image input by a user. A selection menu M11 is a menu to designate a pathological image to be displayed on a screen in a case where a plurality of pathological images are input. The example in FIG. 5 shows that 40 tumor-cell-related pathological images are input and that a third pathological image is currently displayed.

In a display area W10 in FIG. 5, grid-like borders are superimposed and displayed on an enlarged image of a part of a pathological image. In the display area W10, one region surrounded by borders corresponds to one partial image. In an overview display area W11, an image of the whole pathological image and a display frame V11 indicating a region of the pathological image which is displayed on an enlarged scale in the display region W10 are displayed. The position or the size of the display frame V11 may be arbitrarily changed by, for example, a mouse manipulation. If the input unit 102 receives change of the position or the size of the display frame V11, the display control unit 101 changes a pathological image to be displayed on an enlarged scale in the display region W10 in accordance with the changed position and size of the display frame V11.

Since the size (vertical and horizontal pixel counts) of a partial image is defined in advance in accordance with a learning model as a learning object, a user may be disallowed to arbitrarily change the size. The example in FIG. 5 shows that the size of a partial image is 300 pixels in the vertical direction by 300 pixels in the horizontal direction.

A display frame T10 indicating a position of a partial image, for which input of a label from a user is to be received, is also displayed in the display area W10. A position of the display frame T10 can be arbitrarily changed by selecting, by a user, a partial image for which the user desires to input a label. The display of the display frame T10 allows the user to recognize at which position and to which partial image the user is trying to give a label.

For a partial image, for which label input is complete, information indicating an input label is superimposed and displayed on the partial image. In the example in FIG. 5, the letter "T" is displayed at the upper left of a partial image given a label indicating that the partial image is a tumor cell image, and the letter "N" is displayed at the upper left of a partial image given a label indicating that the partial image is not a tumor cell image.

The display control unit 101 may display, on a screen where labeling is to be performed, both information indicating a ratio of respective labels to be given to each of a plurality of partial images, the ratio being a target value, and information indicating an actual value of a ratio of respective labels that have been given to a plurality of partial images. For example, assume that the condition that, if a ratio between tumor cell images and non-tumor images is set at 1:4 in learning data, recognition accuracy of a learned model increase is present. In the example in FIG. 5, the criterial description "The target value for the label ratio between T and N is T:N=1:4" is displayed in terms of a target value in a memo display region A10 which displays a criterion for labeling. This shows that it is desirable to give labels such that a ratio between the number of partial images labeled T and the number of partial images labeled N is 1:4. A ratio between already given labels is displayed as information indicating an actual value of a ratio of respective labels that have been given to a plurality of partial images in a display region N10. That is, the example in FIG. 5 shows that although it is desirable to set the ratio between the number of partial images labeled T and the number of partial images labeled N at 1:4, the ratio between the number of partial images labeled T and the number of partial images labeled N is 1:2 at present. Thus, a user can recognize that the user needs to search for a partial image which is not a tumor cell image and label the partial image until the ratio displayed in the display region N10 is 1:4.

The display control unit 101 may display, on the screen where labeling is to be performed, both a target value for the number of partial images to be labeled and information indicating an actual value of the number of partial images to which labels have been given. For example, assume that the condition that, if 2,000 images are learned as learning data, recognition accuracy of a learned model increase is present. In the example in FIG. 5, the criterial description "The target number for the number of tiles to be labeled is 2,000" is displayed in terms of a target value in the memo display region A10. This shows that a user who gives labels desirably gives labels to 2,000 partial images. An actual value of the number of partial images to which labels have already been given is displayed in a display region N11. Thus, the user can recognize that the user needs to give labels to 1,000 more partial images.

A plurality of partial images may be images generated by dividing a pathological image at a predetermined interval in a rightward direction and in a downward direction (e.g., at the interval of 300 pixels in the rightward direction and at the interval of 300 pixels in the downward direction) from a point (e.g., a pixel on the upper left) serving as a reference in the pathological image. The plurality of partial images are not limited to the above-described ones and may be images generated by dividing the pathological image at a predetermined interval in a left-right direction and in an up-down direction (e.g., at the interval of 300 pixels in the right-left direction and at the interval of 300 pixels in the up-down direction) from a point shifted by a predetermined distance from the point serving as the reference in the pathological image. For example, the plurality of partial images may be images generated by dividing the pathological image at the predetermined interval in the rightward direction and in the downward direction with respect to a point (pixel) shifted in the rightward direction and/or the downward direction by the predetermined distance from the point (an image on the upper left) serving as the reference in the pathological image. An offset value designation region M12 is a region for designating by how many pixels the point serving as the reference in the pathological image is to be shifted in the rightward direction. An offset value designation region M13 is a region for designating by how many pixels the point serving as the reference in the pathological image is to be shifted in the downward direction. When designation of the predetermined distance is received by the input unit 102, the display control unit 101 divides a partial image with respect to a point shifted by the designated predetermined distance from the point on the upper left of the pathological image and displays divided images on the screen.

Figure 6:
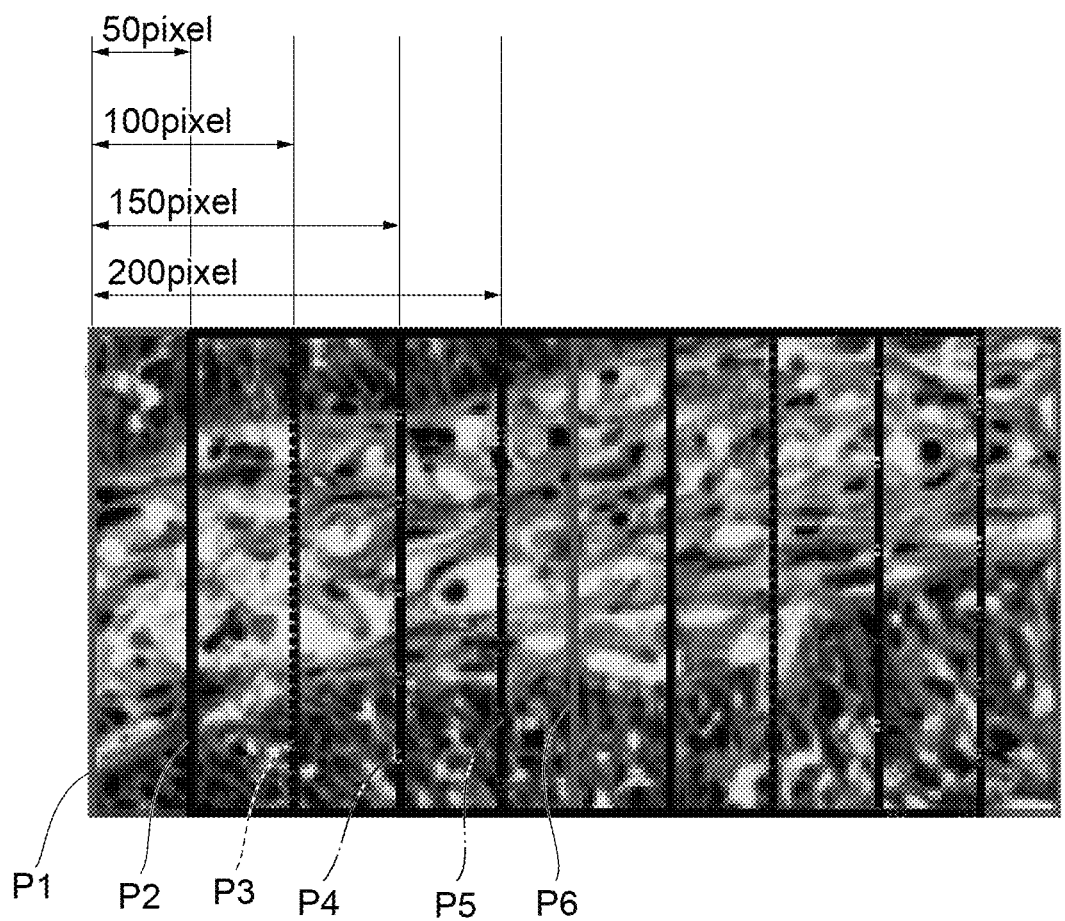

A specific example will be described using FIG. 6. A partial image P1 indicates a partial image located uppermost and leftmost in a pathological image in a case where partial images are generated by dividing the pathological image at a predetermined interval in a rightward direction and in a downward direction with respect to the upper left of the pathological image, and a partial image P6 indicates a partial image to the immediate right of the partial image P1. Assume that, in this state, 50 pixels and 0 pixels are input in the offset value designation regions M12 and M13, respectively, in FIG. 5. In this case, a partial image P2 is generated with respect to a point shifted by 50 pixels rightward from the upper left of the pathological image. Similarly, assume that 100 pixels and 0 pixels are input in the offset value designation regions M12 and M13, respectively, in FIG. 5. In this case, a partial image P3 is generated with respect to a point shifted by 100 pixels rightward from the upper left of the pathological image.

CONCLUSION

According to the above-described embodiment, the data generation apparatus 10 is configured to divide an image into a plurality of partial images and display the plurality of partial images, and receive input of a label from a user for each partial image. This allows easier generation of image-related learning data.

The data generation apparatus 10 is also configured to change color-related pixel values of a plurality of pathological images in accordance with a pixel value change method determined for an image type corresponding to the plurality of images. This makes it possible to change tones of a plurality of images to more appropriate tones suitable for a learning model to learn in accordance with an image type and generate a learned model with higher recognition accuracy.

The data generation apparatus 10 is also configured to display a target value and an actual value for a ratio between types of labels to be given to respective partial images. Since a user can give a label to each partial image such that the actual value approaches the target value, it is possible to efficiently generate learning data for generation of a learned model with higher recognition accuracy.

The data generation apparatus 10 is capable of dividing an image into partial images with respect to an arbitrary point (pixel) on the image at the time of division of the image into partial images. This allows a user to generate a large number of pieces of learning data even in a case where the number of input images is small by performing labeling and then repeating the work of shifting a reference point at the time of division of an image into partial images and performing labeling again.

The above-described embodiment is intended to facilitate understanding of the present invention and is not intended to limitedly interpret the present invention. The flowchart and the sequence described in the embodiment, the elements that the embodiment includes and the arrangement, the materials, the conditions, the shapes, the sizes, and the like thereof are not limited to those illustrated and can be appropriately changed. It is also possible to partially replace or combine components illustrated in different embodiments.

REFERENCE SIGNS LIST

1: image processing system; 10: data generation apparatus; 11: processor; 12: storage device; 13: communication IF; 14: input device; 15: output device; 20: diagnosis apparatus; 100: storage unit; 101: display control unit; 102: input unit; 103: generation unit; 104: image processing unit

The invention claimed is:

1. A data generation apparatus comprising:
a display control unit that displays, on a screen, a pathological image and borders of a plurality of partial pathological images generated by dividing the pathological image into a plurality of pieces while the pathological image and the borders are superimposed;
an input unit that receives input of a pathology-related label to be given to each of the plurality of partial pathological images; and
a generation unit that generates learning data for causing a learning model to learn by associating each of the plurality of partial pathological images with the pathology-related label given to a corresponding partial pathological image of the plurality of partial pathological images; wherein
the input unit stores a partial pathological image ID for unique identification of each of the plurality of partial pathological images and the pathology-related label given to the corresponding partial pathological image of the plurality of partial pathological images in a label database in association with each other,
the generation unit acquires the partial pathological image ID and the pathology-related label from the label database, extracts image data of a partial pathological image corresponding to the partial pathological image ID from among pathological images stored in a pathological image database and generates the learning data by combining the extracted image data of the partial pathological image and the pathology-related label corresponding to the partial pathological image ID,
the input unit rejects pathology-related label input for a partial pathological image that meets a predetermined condition among the plurality of partial pathological images, and
the generation unit excludes the partial pathological image, for which pathology-related label input is rejected, among the plurality of partial pathological images from the learning data.

2. The data generation apparatus according to claim 1, wherein the pathological image includes a plurality of pathological images,
the input unit receives input of information on an image type corresponding to the plurality of pathological images, and
the data generation apparatus further comprises an image processing unit that changes color-related pixel values of the plurality of pathological images in accordance with a change method determined for the image type input to the input unit.

3. The data generation apparatus according to claim 2, wherein
the change method includes a method that changes an RGB value of each of pixels in the plurality of pathological images to a standardized value and a method that randomly changes the RGB value of each of the pixels in the plurality of pathological images.

4. The data generation apparatus according to any one of claims 1 to 3, wherein
the display control unit displays both information indicating a ratio of respective pathology-related labels to be given to each of the plurality of partial pathological images, the ratio being a target value, and information indicating an actual value of a ratio of the respective pathology-related labels that have been given to the plurality of partial pathological images.

5. The data generation apparatus according to any one of claims 1 to 3, wherein
the plurality of partial pathological images are pathological images generated by dividing the pathological image at a predetermined interval in a right-left direction and in an up-down direction from a point shifted by a predetermined distance from a point serving as a reference in the pathological image, and
the input unit receives designation of the predetermined distance.

6. A data generation method to be executed by a data generation apparatus, comprising:
a step of displaying, on a screen, a pathological image and borders of a plurality of partial pathological images generated by dividing the pathological image into a plurality of pieces while the pathological image and the borders are superimposed;
a step of receiving input of a pathology-related label to be given to each of the plurality of partial pathological images;
a step of generating learning data for causing a learning model to learn by associating each of the plurality of partial pathological images with the pathology-related label given to a corresponding partial pathological image of the plurality of pathological partial images;
a step of storing a partial pathological image ID for unique identification of each of the plurality of partial pathological images and the pathology-related label given to the corresponding partial pathological image of the plurality of partial pathological images in a label database in association with each other;

a step of acquiring the partial pathological image ID and the pathology-related label from the label database;

a step of extracting image data of a partial pathological image corresponding to the partial pathological image ID from among pathological images stored in a pathological image database;

a step of generating the learning data by combining the extracted image data of the partial pathological image and the pathology-related label corresponding to the partial pathological image ID;

a step of rejecting pathology-related label input for a partial pathological image that meets a predetermined condition among the plurality of partial pathological images; and a step of excluding the partial pathological image, for which pathology-related label input is rejected, among the plurality of partial pathological images from the learning data.

7. A computer-readable non-transitory storage medium storing a program for causing a computer to execute:

a step of displaying, on a screen, a pathological image and borders of a plurality of partial pathological images generated by dividing the pathological image into a plurality of pieces while the pathological image and the borders are superimposed;

a step of receiving input of a pathology-related label to be given to each of the plurality of partial pathological images;

a step of generating learning data for causing a learning model to learn by associating each of the plurality of partial pathological images with the pathology-related label given to a corresponding partial pathological image of the plurality of partial pathological images;

a step of storing a partial pathological image ID for unique identification of each of the plurality of partial pathological images and the pathology-related label given to the corresponding partial pathological image of the plurality of partial pathological images in a label database in association with each other;

a step of acquiring the partial pathological image ID and the pathology-related label from the label database;

a step of extracting image data of a partial pathological image corresponding to the partial pathological image ID from among pathological images stored in a pathological image database;

a step of generating the learning data by combining the extracted image data of the partial pathological image and the pathology-related label corresponding to the partial pathological image ID;

a step of rejecting pathology-related label input for a partial pathological image that meets a predetermined condition among the plurality of partial pathological images; and a step of excluding the partial pathological image, for which pathology-related label input is rejected, among the plurality of partial pathological images from the learning data.

8. The computer-readable non-transitory storage medium according to claim 7, wherein the pathological image includes a plurality of pathological images, and the computer further executes steps comprising:

receiving input of information on an image type corresponding to the plurality of pathological images, and changing color-related pixel values of the plurality of pathological images in accordance with a change method determined for the image type.

9. The computer-readable non-transitory storage medium according to claim 8, wherein the change method includes a method that changes an RGB value of each of pixels in the plurality of pathological images to a standardized value and a method that randomly changes the RGB value of each of the pixels in the plurality of pathological images.

10. The computer-readable non-transitory storage medium according to claim 7, wherein the computer further displays both information indicating a ratio of respective pathology-related labels to be given to each of the plurality of partial pathological images, the ratio being a target value, and information indicating an actual value of a ratio of the respective pathology-related labels that have been given to the plurality of partial pathological images.

11. The computer-readable non-transitory storage medium according to claim 7, wherein the plurality of partial pathological images are pathological images generated by dividing the pathological image at a predetermined interval in a right-left direction and in an up-down direction from a point shifted by a predetermined distance from a point serving as a reference in the pathological image, and wherein the computer further executes steps comprising receiving designation of the predetermined distance.

* * * * *